United States Patent
Cuervo et al.

(10) Patent No.: US 8,599,852 B2
(45) Date of Patent: Dec. 3, 2013

(54) OPEN SERVICE DISCOVERY AND ROUTING MECHANISM FOR CONFIGURING CROSS-DOMAIN TELECOMMUNICATION SERVICES

(75) Inventors: J. Fernando Cuervo, Ottawa (CA); Michel Sim, Ottawa (CA); Pierrick Jacques Guingo, Ottawa (CA); Arnoldus Joannes Jacobus Jansen, Manotick (CA)

(73) Assignee: Alcatel Lucent, Paris (FR)

( * ) Notice: Subject to any disclaimer, the term of this patent is extended or adjusted under 35 U.S.C. 154(b) by 2148 days.

(21) Appl. No.: 10/903,436

(22) Filed: Jul. 30, 2004

(65) Prior Publication Data
US 2005/0259655 A1   Nov. 24, 2005

(30) Foreign Application Priority Data
May 20, 2004  (CA) .................................... 2467945

(51) Int. Cl.
- *G01R 31/08* (2006.01)
- *G06F 11/00* (2006.01)
- *H04L 5/22* (2006.01)
- *H04L 12/28* (2006.01)
- *H04B 7/00* (2006.01)

(52) U.S. Cl.
USPC ........... 370/392; 370/223; 370/224; 370/254; 370/298; 370/310; 370/351; 370/910; 370/912

(58) Field of Classification Search
USPC ......... 370/254, 298, 310, 351, 901, 912, 392, 370/469; 709/223, 224
See application file for complete search history.

(56) References Cited

U.S. PATENT DOCUMENTS

| | | | | |
|---|---|---|---|---|
| 5,917,820 A * | 6/1999 | Rekhter | ................ | 370/392 |
| 6,064,666 A * | 5/2000 | Willner et al. | ................ | 370/352 |
| 6,594,279 B1 * | 7/2003 | Nguyen et al. | ................ | 370/468 |
| 6,799,216 B2 * | 9/2004 | Steegmans | ................ | 709/228 |
| 6,823,395 B1 * | 11/2004 | Adolfsson | ................ | 709/242 |
| 6,829,250 B2 * | 12/2004 | Voit et al. | ................ | 370/467 |
| 7,197,546 B1 * | 3/2007 | Bagga et al. | ................ | 709/223 |
| 2002/0171892 A1 * | 11/2002 | Marmur et al. | ................ | 359/133 |
| 2003/0016678 A1 | 1/2003 | Maeno | | |
| 2003/0191834 A1 * | 10/2003 | Steegmans | ................ | 709/224 |
| 2004/0072557 A1 * | 4/2004 | Paila et al. | ................ | 455/414.1 |
| 2005/0086340 A1 * | 4/2005 | Kang et al. | ................ | 709/224 |

OTHER PUBLICATIONS

Moy, J. IETF RFC 1583, "OSPF Version 2," 1994.

* cited by examiner

*Primary Examiner* — Hassan Phillips
*Assistant Examiner* — Lonnie Sweet
(74) *Attorney, Agent, or Firm* — Marks & Clerk

(57) ABSTRACT

Apparatus and method are provided for distributing service domain reachability information across domain boundaries, thereby allowing domain management systems to determine routing for cross-domain services even when the domains have different technologies or administrators. A Service Domain Manager within each domain advertises to neighbouring domains which services it supports. A domain which receives such advertisements forwards the advertisement on to other domains. Each SDM builds a routing information table which specifies the service, the domain, the next hop, and optionally user defined metrics. The routing information table does not include end-point addresses, in order to keep the size of the table manageable. In this way, the NMS of each domain obtains an end-to-end view of service routes.

10 Claims, 4 Drawing Sheets

OPEN SERVICE DISCOVERY AND ROUTING MECHANISM FOR CONFIGURING CROSS-DOMAIN TELECOMMUNICATION SERVICES

CROSS-REFERENCE TO OTHER APPLICATIONS

This application claims priority from Canadian Patent Application 2,467,945, entitled "Open Service Discovery and Routing Mechanism for Configuring Cross-Domain Telecommunication Services" and filed on May 20, 2004.

FIELD OF THE INVENTION

The invention relates to routing within telecommunication networks, and more particularly to exchange of reachability information in multi-domain networks.

BACKGROUND OF THE INVENTION

Configuration and operation of cross-domain services is a major issue for network and network-service providers. As service providers establish peering and wholesale relationships with multiple service provider partners, they find themselves in a complex situation in which services must be deployed across a constellation of different and non-integrated vendor, service, and technology-specific management systems. The problem of cross-domain service management, whether it means coordinating management operations across internal administrations, technologies, vendors, or with management systems of external providers is mainly caused by the ineffectual methods for exchanging network-service information between disparate domain management systems.

At the same time, the mix of technologies in telecommunications networks offers multiple implementation options for connecting end-users to the network and providing transport of service traffic. It becomes almost impossible for end-users and service providers to make effective implementation choices. For example, based on congestion, availability, or cost, an enterprise may decide to send data via a secure private tunnel over the Internet, or choose a managed IP VPN service from one or more Network Service Providers offering the same service with guaranteed Service Level Agreements (for example, Quality of Service, availability) and differentiated pricing. Similarly, a Network Access Provider might choose to establish multiple peering arrangements with Internet Service Providers to offer Internet Access Services to its access customers. In this environment, one needs to have adequate information to make an informed decision. However, a predetermined way to implement a service across the various network and network management domain administrations is not viable.

Currently, methods for integrating management systems are either based on deploying manual and static workflow procedures or building a costly, highly integrated and service-specific umbrella management system. The manual solution requires that the workflow procedures be coordinated across various vendor-specific domain managers using various Graphical User Interfaces. Service operators must manually exchange peering information and interconnection agreements about their respective networks as each domain manager is restricted to viewing and managing only the resources under its direct supervision. The integrated solution requires that the umbrella management system interfaces with all the involved domain management systems. However, integration of domain managers into an OSS system can lead to scalability problems, since a very large set of detailed management information from all domain managers must be maintained within a single system, while resources are micro-managed at the lowest level. An integrated solution may also be relatively inflexible, having limited adaptability to changes. An integrated solution also requires each service provider to give up some control over resources in its domain, which service providers may be reluctant to do as it would require exposing information to other domains.

Within the network layer, network elements have for many years adopted a distributed and collaborative inter-working approach based on the capability of exchanging reachability information on a peer-to-peer basis using dedicated advertisement mechanisms for specific services. The best example of such mechanisms is the Border Gateway Protocol 4 (BGPv4) that has proven to be very useful in large scale networks, namely the Internet. Nevertheless, some scalability and security problems have been identified with respect to BGPv4. Furthermore BGPv4, as a means to exchange reachability information, is technology specific in that it refers to addresses that are specific to a transport or networking technology. As a result, no end-to-end mechanism exists to support service routing convergence across those different networks.

A distributed mechanism for exchanging service reachability information across domains of different technologies or administrations would permit routing of cross-domain services, without requiring a costly and inflexible umbrella management system.

SUMMARY OF THE INVENTION

In accordance with one aspect of the invention, a method is provided for distributing service domain reachability information across domain boundaries in a communication network, the domains differing in at least one of administrator, technology, and vendor. An advertisement identifying a service supported within a domain is transmitted to at least one peer domain. Receipt of advertisements from peer domains is monitored. Upon receipt of an advertisement from a peer domain the advertisement is propagated to other peer domains and the routing information table is updated by adding an identification of the service, an identification of an originating domain of the advertisement, and an identification of the peer domain. At least one metric associated with the service, the originating domain, and the peer domain may be computed and added to the routing information table.

The methods may be stored as instructions on a non-transitory computer-readable storage medium, to be executed by a computer processor. Apparatus is also provided for implementing the methods of the invention, such as a network element.

The method and apparatus of the present invention allow reachability information to be exchanged across domains. The mechanism of the invention can support any types of services, is designed to handle multi-domain networks including networks consisting of multiple service providers, and is technology-agnostic, allowing services to be implemented in diverse networks providing diverse network technologies. In contrast to BGPv4, which focuses on host reachability (or Service Access Point reachability in the language used herein), the invention focuses on domain reachability. The objective is for a user or software to be able to ascertain that a domain can reach another domain using a particular network service. Together with the distribution of the load of advertising, learning and updating system information across domain managers in a peer-to-peer manner, scalability problems are significantly reduced or eliminated since the system scales in relationship to the number of domains and not to the number of reachable destinations. Bottlenecks and single points of failure are avoided by using the peer-to-peer model. New services can be defined and advertised to peer domains, and new metrics can be defined and used in computing routes. New services can also be dynamically introduced without disruption to existing services. Control over each domain is maintained by each domain manager and information exchange between peer domains is minimal, thus alleviating issues of trust and privacy restrictions among different administrations.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
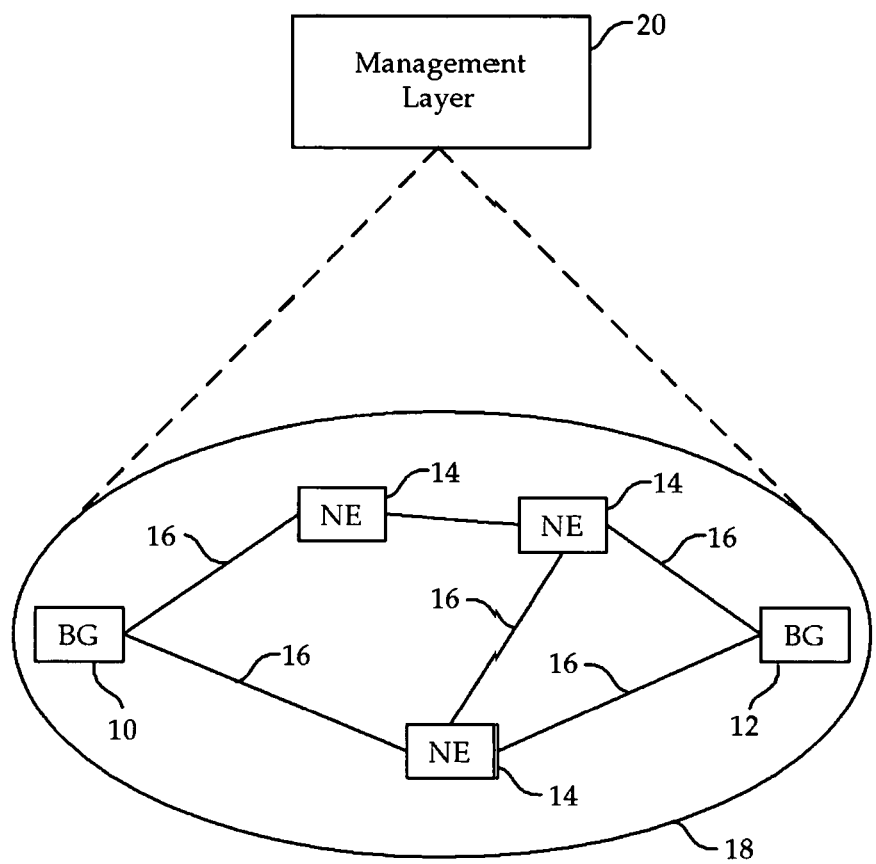
FIG. 1 is a diagram of an example domain in which the invention is implemented according to one embodiment of the invention.

Referring to FIG. 1, an example of a telecommunication domain is shown. The domain includes a first border gateway 10, a second border gateway 12, and a plurality of interior network elements 14. Collectively, the first border gateway 10, the second border gateway 12, and the plurality of interior network elements 14 are referred to as network elements 18 of the domain. The network elements of the domain are variously interconnected by communication links 16. The domain shown in FIG. 1 is for example purposes only. More generally, the domain includes a plurality of network elements, at least two of which are border gateways. The border gateways provide communication access to devices outside the domain, such as border gateways of other domains or end user devices.

The domain also includes a management layer 20. The management layer 20 comprises a plurality of components, including a Service Domain Manager (SDM). The SDM is preferably in the form of software instructions located on one or more of the network elements of the domain, in particular on the border gateways as it is the border gateways which communicate directly with other domains according to the invention. Alternatively, the SDM may be located on separate workstations communicating with the network elements.

Figure 2:
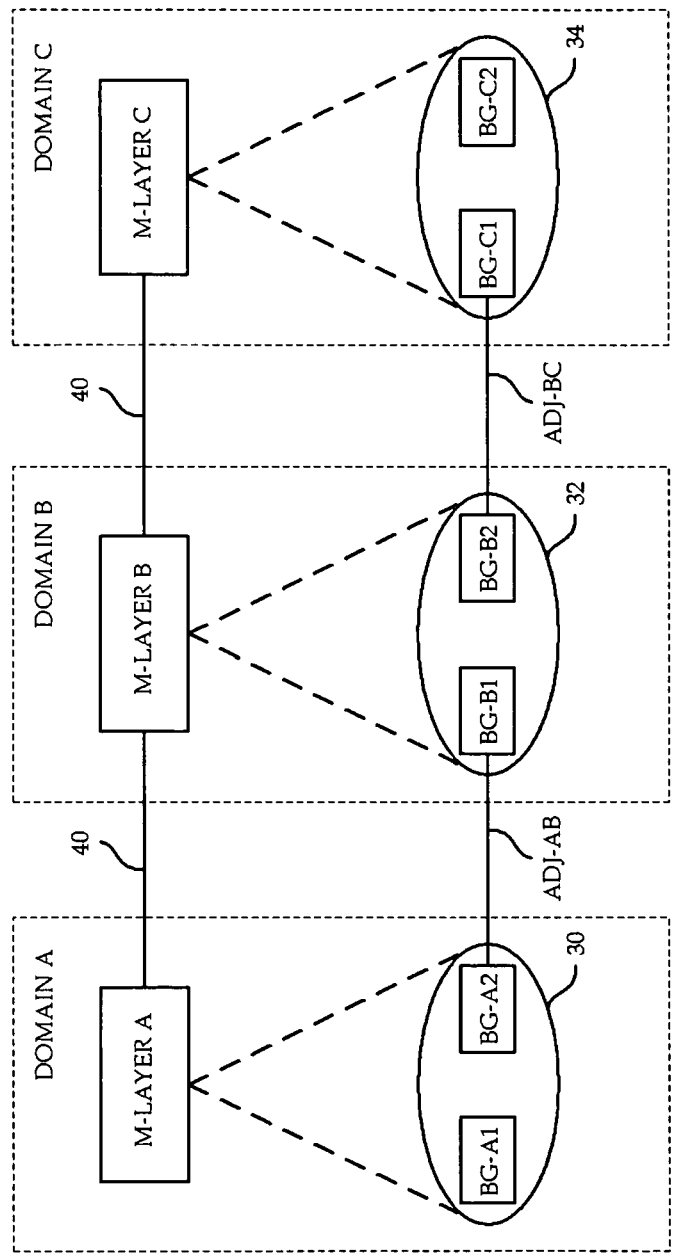
FIG. 2 is a diagram of an example multi-domain network according to one embodiment of the invention.

Referring to FIG. 2, an example multi-domain network is shown. The multi-domain network includes a first domain A, a second domain B, and a third domain C. Each of these domains is similar in concept to the example domain described above with reference to FIG. 1, each domain having a plurality of internal network elements (not shown in FIG. 2), border gateways, and a management layer. The first domain A has a set of network elements 30, including a first border gateway BG-A1 and second border gateway BG-A2, and a management layer M-A. The second domain B has a set of network elements 32, including a first border gateway BG-B1 and second border gateway BG-B2, and a management layer M-B. The third domain C has a set of network elements 34, including a first border gateway BG-C1 and second border gateway BG-C2, and a management layer M-C. The domains A, B, and C are distinct in at least one of technology employed and administration. For example, domain A may be an ATM-based network offering Ethernet transport services over ATM circuits, domain B may be a SONET-based network offering Ethernet transport services using SONET frame encapsulation, and domain C may be a SONET-based network offering the same type of Ethernet transport services but under a different administrative control than that of domain B, and perhaps implemented using equipment from a different vendor as that of domain B.

The management layers in each of the domains communicate with each other over management layer communication channels 40. The management layer communication channels may be in-path or out-of-path.

An adjacency ADJ-AB exists between the second border gateway BG-A2 of the first domain A and the first border gateway BG-B1 of the second domain B. An adjacency ADJ-BC exists between the second border gateway BG-B2 of the second domain B and the first border gateway BG-C1 of the third domain C. Each adjacency is defined as the physical connection between the respective border gateways, a set of services supported across the physical connection, and policies associated with each of the services within the set of supported services. The physical connection may be of any type, such as an Ethernet link connection. The policies form part of an adjacency service contract, which is established by the operators when establishing the physical connection. Examples of information that may be included within the policies are allowed service profiles, bandwidth allocation policies, label allocation policies, resource allocation policies, and actions to be taken when competition for resources occurs.

The multi-domain network described with reference to FIG. 2 is for example purposes only. More generally, there are a plurality of domains, each distinct in its combination of administration, network service, and implementation technology, within the multi-domain network. Each domain has a management layer which communicates with the management layer of the other domains via management layer communication channels. Each domain has border gateways, and adjacencies exist between border gateways of neighbouring domains.

Figure 3:
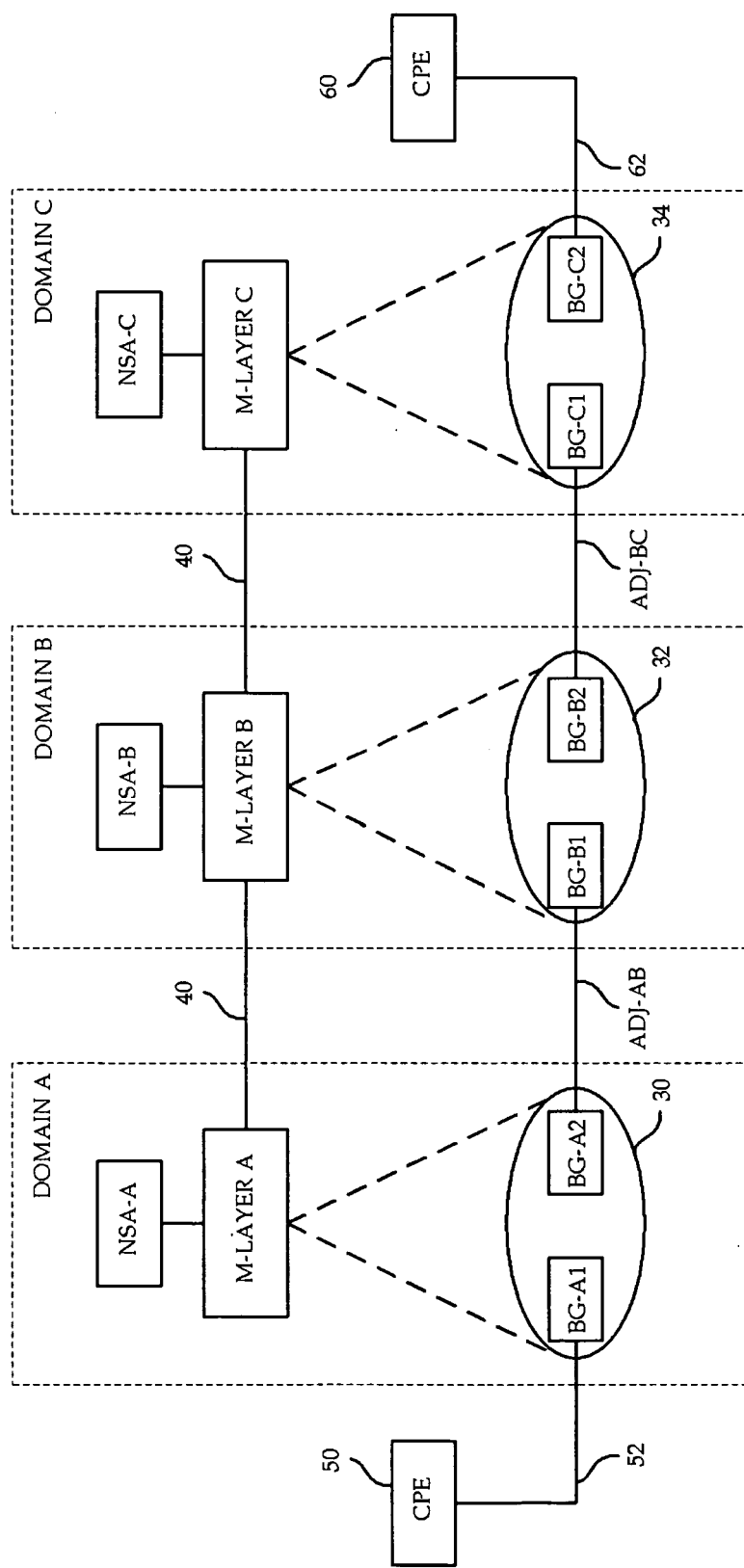
FIG. 3 is a diagram of an example service implemented across the multi-domain network of FIG. 2.

Referring to FIG. 3, an example point-to-point service is shown across the multi-domain network described with reference to FIG. 2. A first end user 50 communicates with the first border gateway BG-A1 of the first domain A through a first Service Access Point (SAP) 52. A second end user 60 communicates with the second border gateway BG-C2 of the third domain C through a second SAP 62. The service is carried over an end-to-end link (which may be connection-oriented or connectionless) from the first end user 50, through the first SAP 52, through the network elements 30 of the first domain A, over the adjacency ADJ-AB between the first domain A and the second domain B, through the network elements 32 of the second domain B, over the adjacency ADJ-BC between the second domain B and the third domain C, through the network elements 34 of the third domain C, and through the second SAP 62 to the second end user 60.

Each SDM contains decision logic and a protocol engine that builds service domain reachability by producing and consuming advertisements of the capabilities of a domain to reach other domains using service segments of a particular type, thereby enabling cross-domain service routing. For scalability reasons, the SDMs only provide domain service reachability information, that is, information indicating whether an end-point can be reached using a particular service through a given domain as opposed to end-point address reachability. The SDMs are also truly open as a policy-based decision process, and provide extensibility in the use and diffusion of third party metrics, another difference with respect to BGP.

For each service supported by an SDM in a domain, the SDM advertises the service over adjacencies through which it can support the service. Therefore neighbouring domains (or more precisely, the SDMs of the neighbouring domains) are made aware that the service is supported by the domain. The advertisements are transitive, in that a domain which receives an advertisement passes that advertisement on to its own neighbouring domains (unless an administrative policy within the domain forbids passing on of the advertisement). For example, if service S is one of the services that can be supported by adjacency ADJ-AB of FIG. 2, the SDM of domain A advertises across adjacency ADJ-AB that it can offer service S. The SDM of domain B forwards the advertisement across adjacency ADJ-BC to domain C. The SDMs do not advertise the technology of the originating domain, but only the service offered by the domain.

The SDMs advertise only domain reachability, and not end-point reachability. Reachability of individual users may be handled by a separate, federated naming service. This arrangement avoids the routing table explosion that is a well known BGP problem and permits the separation of user access policies from the policies for inter-domain routing. The latter enables operators to change their user access policies without requiring route re-computation. This separation also avoids dependencies between routing policies and the aggregation of end-point addresses into prefixes. Each domain is therefore concerned with two fully separate tasks: identifying the domain that hosts an end-point, through use of a separate generalized naming service; and finding a path of domains that can reach the domain that hosts the end-point using a specified service.

Figure 4:
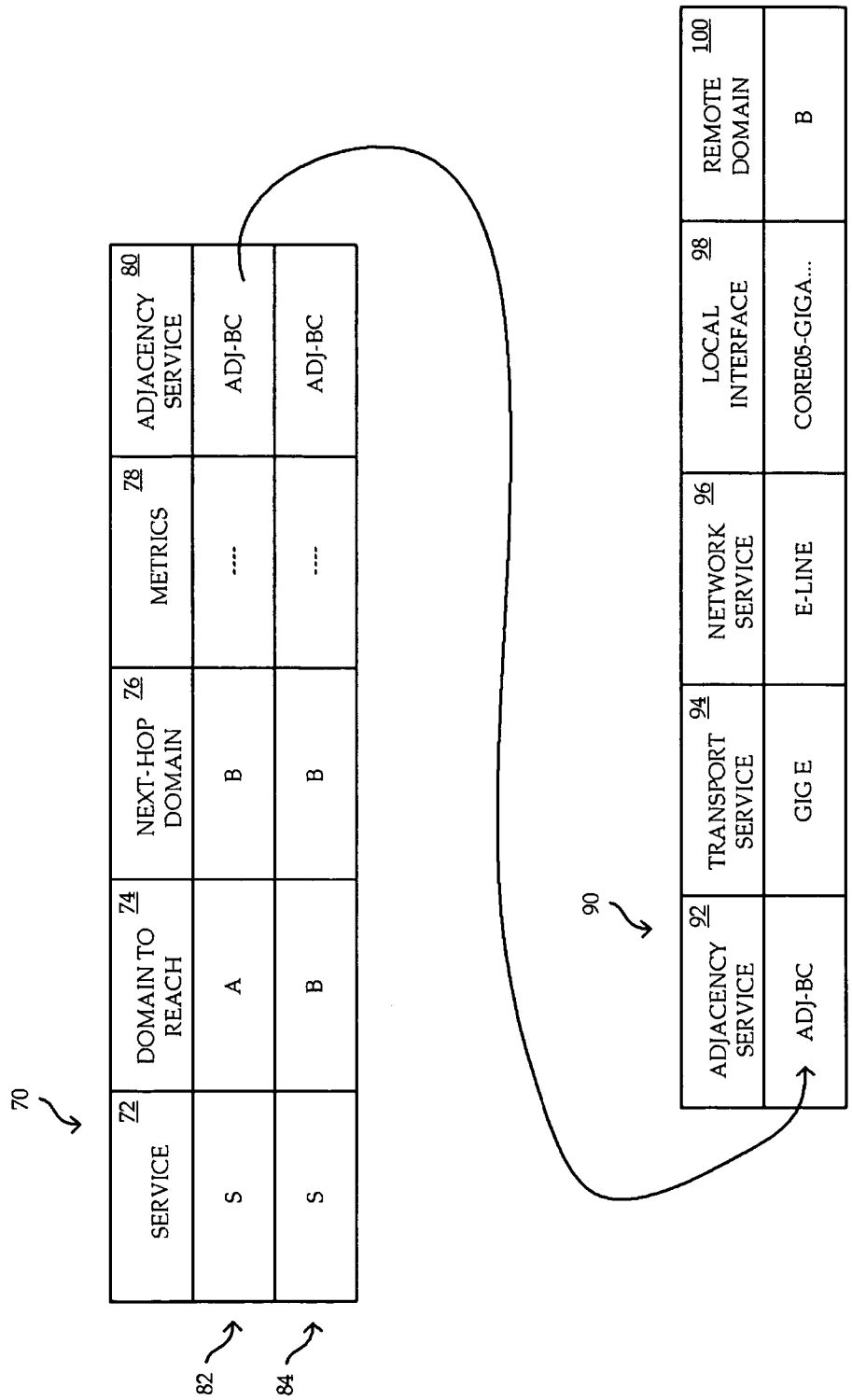
FIG. 4 is an example table of reachability information maintained by Domain C of FIG. 3.

As each domain receives an advertisement, the SDM of the domain updates a routing information table to include an identification of the domain that originated the advertisement, an identification of the service, the domain from which the advertisement was directly received, and zero or more metrics that may be useful to a Routing Service process in selecting a route. The routing information table may also include an identification of the service and the adjacency service over which the advertisement was received, although alternatively a separate routing information table may be maintained for each service and the adjacency service leading to the domain from which the advertisement was received may be stored in a separate set of tables. In this way, the SDM of each domain builds a routing information table having entries correlating, at least, services, end point domains for the service, next hops to reach the domains offering the services, identifications of border gateways within the domain to which services are to be routed internally, and optionally metrics. The routing information table does not identify end points, so as to prevent the very large routing tables that can occur with more traditional route discovery protocols such as BGP. The granularity of the routing information table is therefore at the domain level, and not at the end point level. Once all advertisement exchanges have occurred, the NMS of each domain has a full view of the end-to-end connectivity that is possible for a particular service, by means of the routing information table maintained by the respective SDM. Referring to FIG. 4, an example routing information table maintained by Domain C of FIG. 3 is shown. The routing information table 70 includes a service field 72 identifying the service (unless a separate routing information table is maintained for each service), a domain to reach field 74 identifying a domain of interest, a next-hop domain field 76 identifying a domain which provides the next hop towards the domain of interest, an optional metrics field 78 which may include one or more metrics, and an adjacency service field 80 which identifies the adjacency service through which the next-hop domain is reached (although the adjacency services and the next-hop domains may alternatively be associated using a separate table). When the SDM of domain C (or of any domain) receives an advertisement, it adds an entry to the routing information table 70 (unless the advertisement is a redundant advertisement) and populates the domain to reach field 74 with an identification of the domain that originated the advertisement and populates the next-hop domain field 76 with an identification of the neighbouring domain from which the advertisement was received. In the example routing information table 70, a first entry 82 indicates that the service S is supported by the domain A, which can be reached through domain B over adjacency service ADJ-BC. A second entry 84 indicates that the service S is supported by the domain B, which can be reached through domain B over adjacency ADJ-BC.

An example adjacency service table 90 is also shown in FIG. 4. The adjacency service table 90 may be linked to through the adjacency service field 80 of the routing information table 70, or may be accessed separately. The adjacency service table 90 is populated when the adjacency services are established by the operator of the domain. The adjacency service table 90 includes an adjacency service field 92 identifying the adjacency service, a transport service field 94 identifying the type of transport service, a network service field 96 identifying the type of service, a local interface field 98 identifying the physical interface through which the adjacency service is linked to the domain, and a remote domain field 100 identifying the neighbouring domain to which the adjacency service provides access.

Using an inter-domain protocol, peer domains therefore advertise support for new services within their domain to other domains. If a peer domain which receives this advertisement also supports this service, a peering session is established between the domains. Separate peering sessions are created for each service supported by the domains. Services are thereby treated independently from each other. The peering sessions run over management adjacency channels created at the boundaries between the peer domains as part of the collaboration agreement between the domains. Adjacency channels may be in-path or out-of-path, a key difference with BGP since BGP only allows inter-domain in-path peering sessions. Therefore, the liveness of the peer session of the present invention can be separated from the liveness of the border gateways that provide the cross-domain service transport. This separation provides for added flexibility to adapt to different management requirements and modes of operation, at each adjacency point in an overall end-to-end path. For instance, the normal termination of a peering session may be mutually agreed to signify correct operation and validity of advertisements as long as the transport adjacency operates normally, or until a new peer session is established that may modify the existing advertisements.

When service domain reachability information is received from a peer domain, the service domain reachability information is propagated onto other peer domains which support the service. Metrics may be attached to advertisements to qualify service routes, thereby allowing each domain management system to determine the best route to any destination domain using the criteria particular to the domain management system. Each domain may use metrics or operational policies that are not propagated through the advertisements but that have local significance, and may be provided by other applications or third parties. The service routing information can be dynamically updated throughout the multi-domain network, based on availability of those services and/or the resources to carry out those services within each domain. Each domain management system retains control over its own domain.

The mechanism for exchanging reachability information may be implemented in an architecture for managing cross-domain services, such as that taught by Canadian Patent Application 2,467,939, entitled "Architecture for Configuration and Management of Cross-Domain Network Services", filed on May 20, 2004 and assigned to the same assignee as that of the present invention.

The embodiments presented are exemplary only and persons skilled in the art would appreciate that variations to the embodiments described above may be made without departing from the spirit of the invention. The scope of the invention is solely defined by the appended claims.

We claim:

1. A method of distributing service domain reachability information across domain boundaries in a communication network, the domains differing in at least one of administrator, technology, and vendor, the method comprising:
    transmitting by a domain an advertisement identifying a network service supported within the domain, the network service including an indication of whether an end-point can be reached using a particular service through the domain but without indicating the complete address of the end-point, to at least one peer domain;
    at the domain, monitoring for receipt of advertisements from peer domains; and
    upon receipt of an advertisement from a peer domain by the domain:
        adding to a routing information table an identification of the network service, an identification of an originating domain of the advertisement, and an identification of the peer domain; and
        propagating the advertisement to other peer domains.

2. The method of claim 1 further comprising, upon receipt of an advertisement, adding to the routing information table at least one metric to be associated with the network service with the originating domain, and with the peer domain.

3. The method of claim 1 wherein transmitting an advertisement comprises transmitting the advertisement over an out-of-path channel.

4. The method of claim 1 further comprising establishing a peering session between the domain and the peer domains.

5. A network element within a first domain of a network, the network including at least one other domain differing from the first domain in at least one of administrator, technology, and vendor, at least one of the other domain being a peer domain of the first domain, the network element comprising:
    a routing information table; and
    a service domain manager,
    wherein the network element is configured to:
        transmit to at least one peer domain an advertisement identifying a network service supported within the first domain, the network service including an indication of whether and end-point can be reached through the first domain using a particular service but without indicating the complete address of the end-point, and identifying the first domain;
        monitor for receipt of received advertisements from the at least one peer domain;
        upon receipt of a received advertisement, add to the routing information table an identification of the network service specified by the received advertisement, an identification of an originating domain specified by the received advertisement, and an identification of the peer domain from which the received advertisement was received; and
        upon receipt of a received advertisement, propagate the received advertisement to other peer domains.

6. The network element of claim 5 wherein the network element is configured to transmit the advertisement over an out-of-path channel.

7. The network element of claim 5 further comprising, within the service domain manager, means for establishing a peering session with the at least one peer domain.

8. The network element of claim 5 further configured to:
    upon receipt of a received advertisement, compute at least one new metric value associated with the network service specified by the received advertisement, the originating domain specified by the received advertisement, and the peer domain specified by the received advertisement; and
    associate within the routing information table the at least one metric value.

9. The network element of claim 8 wherein the network element is configured to propagate the at least one metric value along with the received advertisement.

10. A non-transitory computer-readable storage medium storing instructions for use in a network element within a first domain of a network, the network including at least one other domain differing from the first domain in at least one of administrator, technology, and vendor, at least one of the other domain being a peer domain of the first domain, the instructions comprising:
    instructions for maintaining a routing information table;
    instructions for transmitting to at least one peer domain an advertisement identifying a network service supported within the first domain, the network service including an indication of whether and end-point can be reached through the first domain using a particular service but without indicating the complete address of the end-point, and identifying the first domain;
    instructions for monitoring for receipt of received advertisements from the at least one peer domain;
    instructions for, upon receipt of a received advertisement, adding to the routing information table an identification of the network service specified by the received advertisement, an identification of an originating domain specified by the received advertisement, and an identification of the peer domain from which the received advertisement was received; and
    instructions for, upon receipt of a received advertisement, propagating the received advertisement to other peer domains.

* * * * *